(12) United States Patent
Stamoulis et al.

(10) Patent No.: US 9,058,680 B2
(45) Date of Patent: Jun. 16, 2015

(54) MULTI-THREADED MULTI-FORMAT BLENDING DEVICE FOR COMPUTER GRAPHICS OPERATIONS

(75) Inventors: Iakovos Stamoulis, Patras (GR); George Sidiropoulos, Patras (GR); Theodore Roudas, Patras (GR); Nikolaos Strikos, Patras (GR)

(73) Assignee: THINK SILICON LTD, Patras (GR)

( * ) Notice: Subject to any disclaimer, the term of this patent is extended or adjusted under 35 U.S.C. 154(b) by 490 days.

(21) Appl. No.: 13/338,376

(22) Filed: Dec. 28, 2011

(65) Prior Publication Data

US 2013/0169658 A1 Jul. 4, 2013

(51) Int. Cl.
*G09G 5/02* (2006.01)
*G06T 11/00* (2006.01)
*G06T 15/00* (2011.01)

(52) U.S. Cl.
CPC .............. *G06T 11/00* (2013.01); *G06T 11/001* (2013.01); *G06T 15/005* (2013.01)

(58) Field of Classification Search
CPC ..... G06T 15/503; G06T 11/001; G06T 11/60; G09G 2340/10; G09G 5/393
See application file for complete search history.

(56) References Cited

U.S. PATENT DOCUMENTS

| | | | |
|---|---|---|---|
| 1,262,954 A | 4/1918 | Ives | |
| 4,384,338 A | 5/1983 | Bennett | |
| 4,679,040 A | 7/1987 | Yan | |
| 4,827,344 A | 5/1989 | Astle et al. | |
| 5,592,196 A | 1/1997 | Nakamatsu et al. | |
| 5,754,185 A | 5/1998 | Hsiao et al. | |
| 5,896,136 A | 4/1999 | Augustine et al. | |
| 6,092,174 A * | 7/2000 | Roussakov | 712/15 |
| 7,397,479 B2 | 7/2008 | Munshi | |
| 7,973,797 B2 | 7/2011 | Jiao et al. | |
| 8,108,872 B1 * | 1/2012 | Lindholm et al. | 718/104 |
| 2003/0074542 A1 * | 4/2003 | Sasagawa | 712/20 |
| 2005/0237337 A1 * | 10/2005 | Leather et al. | 345/582 |
| 2006/0192788 A1 | 8/2006 | Stollnitz | |
| 2008/0141004 A1 * | 6/2008 | Kershaw et al. | 712/220 |
| 2009/0003730 A1 * | 1/2009 | Pande et al. | 382/298 |
| 2009/0273603 A1 * | 11/2009 | Johnson | 345/504 |
| 2010/0180058 A1 * | 7/2010 | Ihori | 710/117 |
| 2012/0050303 A1 * | 3/2012 | McAllister et al. | 345/589 |

OTHER PUBLICATIONS

Porter, Thomas et al. "Compositing Digital Images" Computer Graphics, vol. 18, No. 3, Jul. 1984, pp. 253-259.

* cited by examiner

*Primary Examiner* — Mark Zimmerman
*Assistant Examiner* — Michelle Chin
(74) *Attorney, Agent, or Firm* — Jason H. Vick; Sheridan Ross, PC

(57) ABSTRACT

The disclosed invention provides a solution for the problem of blending colors in a graphics processing unit. The plurality of blending equations used in various graphics layers is performed with a programmable streaming processor. Multiple simultaneous threads are used to eliminate pipeline latency and memory stalls. Overlays of predefined blending modes are used to minimize the time instruction memory is updated. The processing unit includes: (a) an instruction memory (b) hardware context registers for each executing stream (c) pipelined arithmetic units of predefined precision, including support for floating point (d) units that convert multi-format data to and from floating point precision (e) Look-up tables for quick color space transformations.

20 Claims, 8 Drawing Sheets

A Typical System with Graphics Processing capability

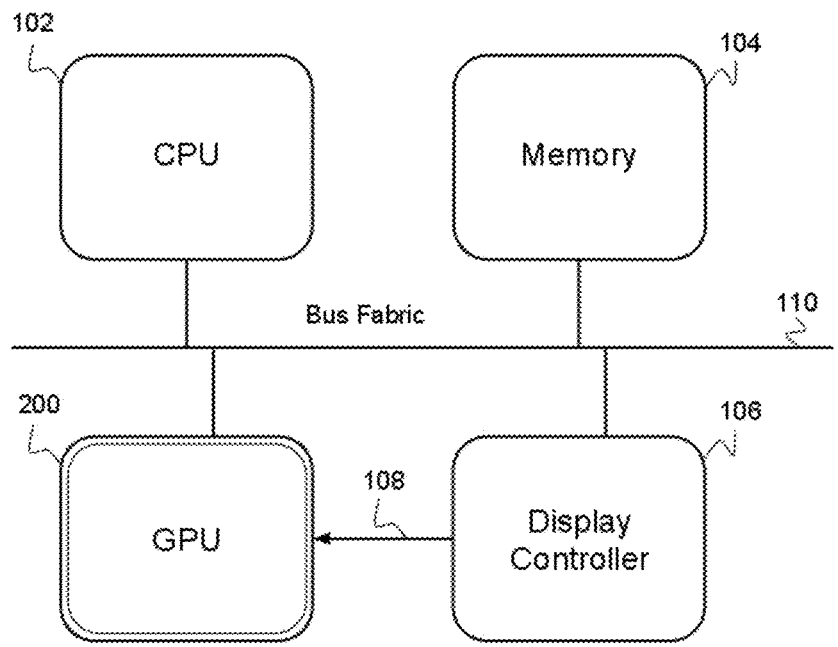
Figure 1: A Typical System with Graphics Processing capability

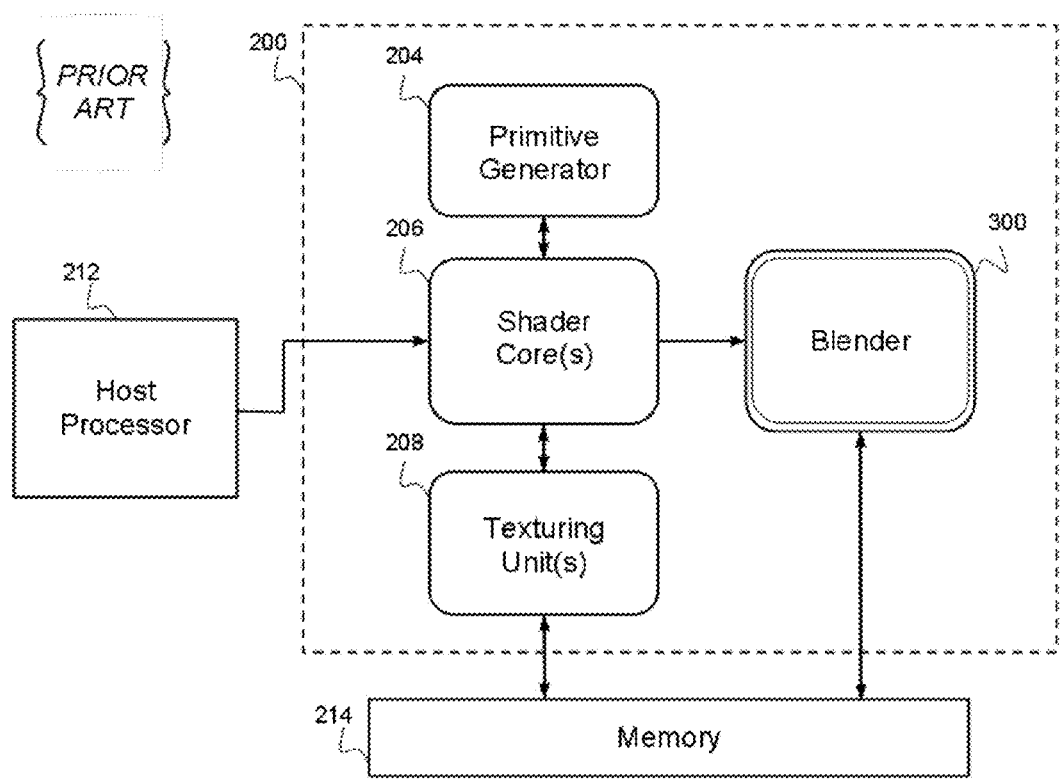
Figure 2: Example Block Diagram of a Graphics Processing Unit

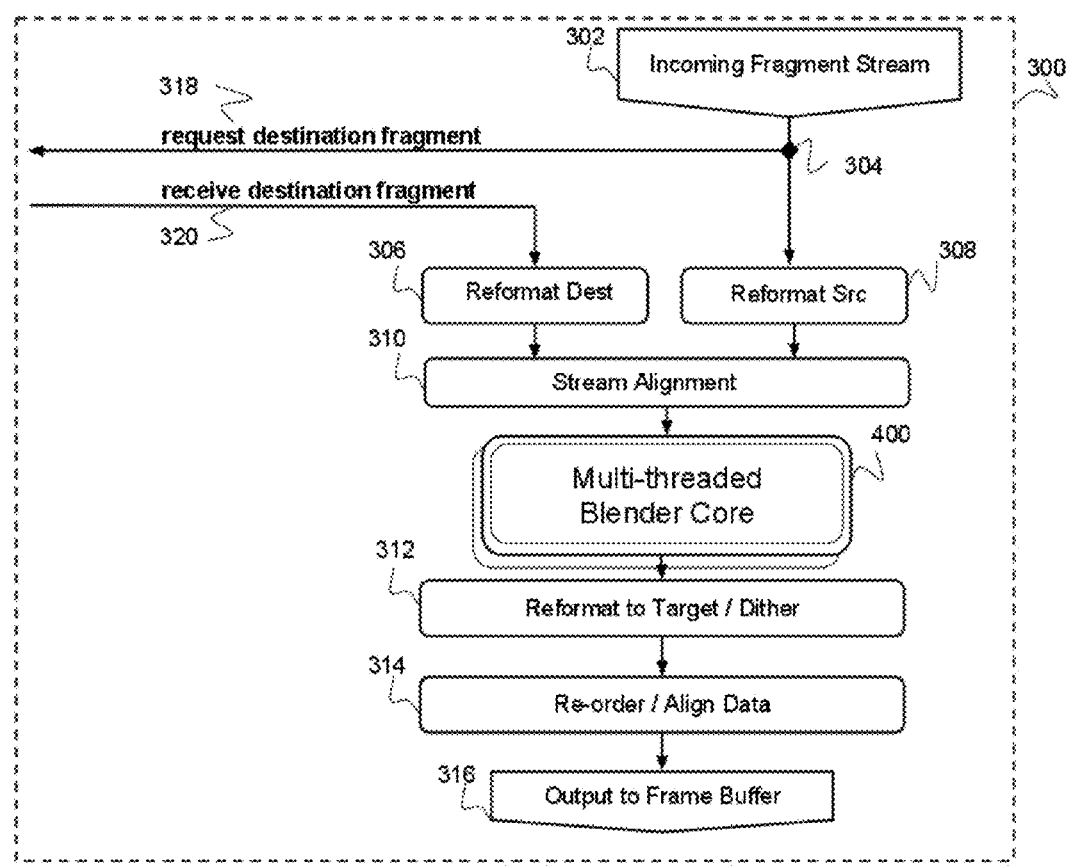
Figure 3: An embodiment of the Blending device

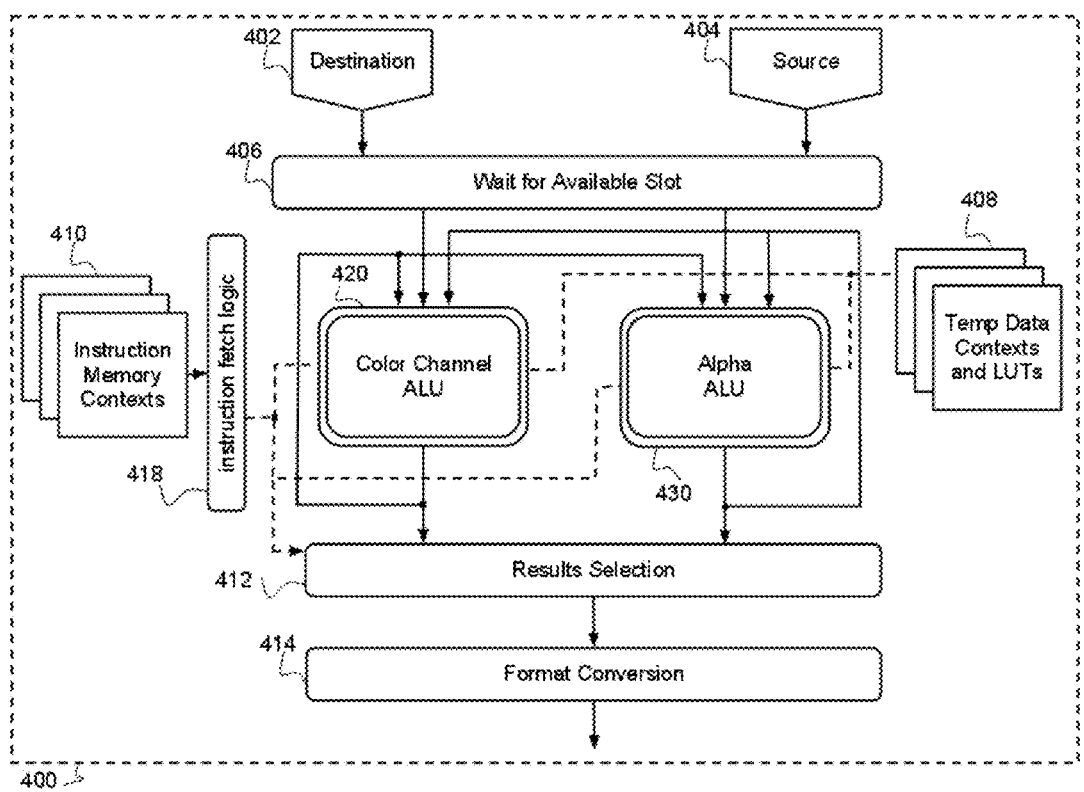
Figure 4: Blending Core structure

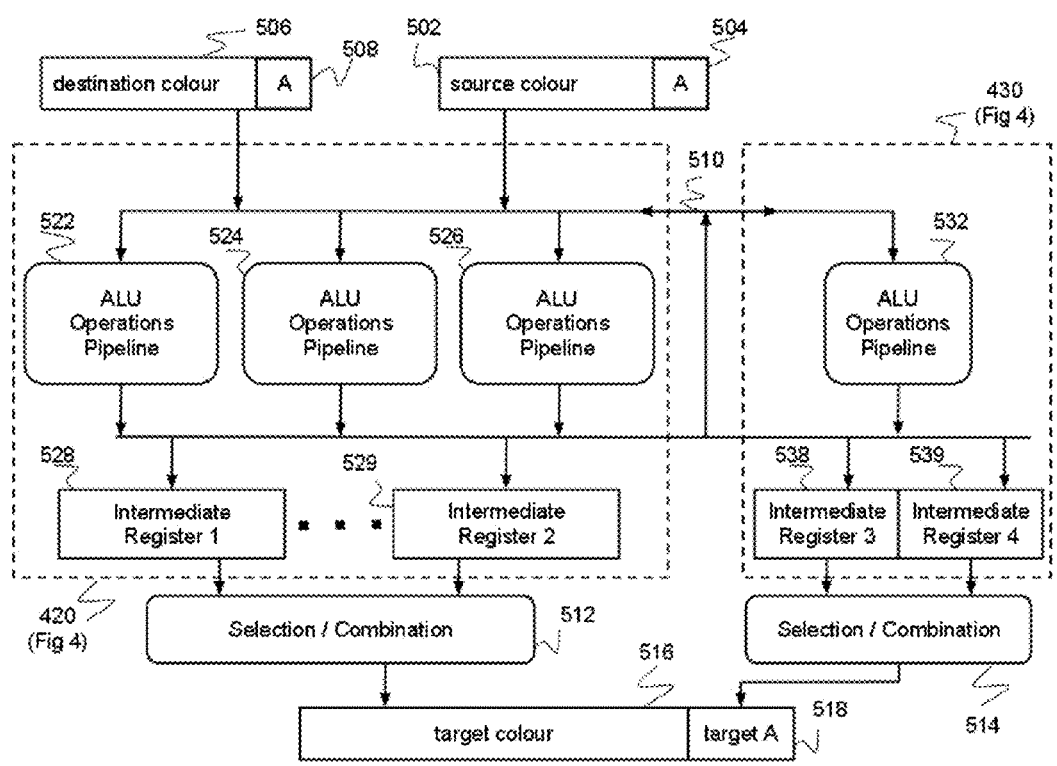
Figure 5: The ALUs of the Blender Core

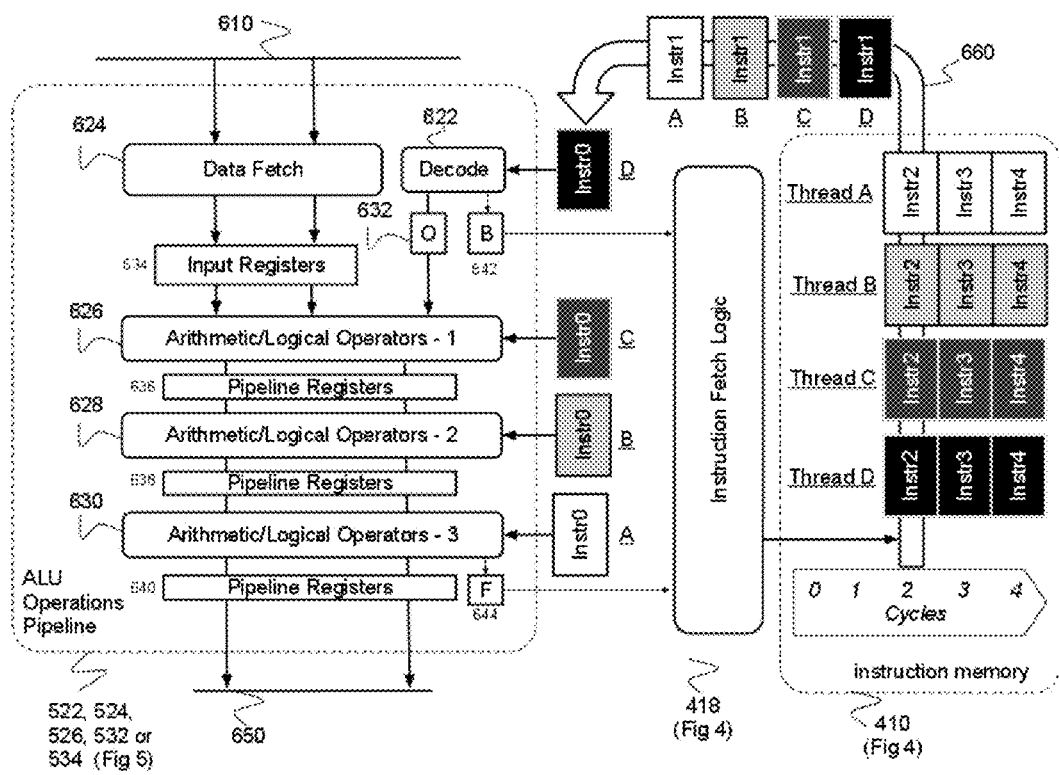
Figure 6: Possible Embodiment of a Multi-threaded ALU

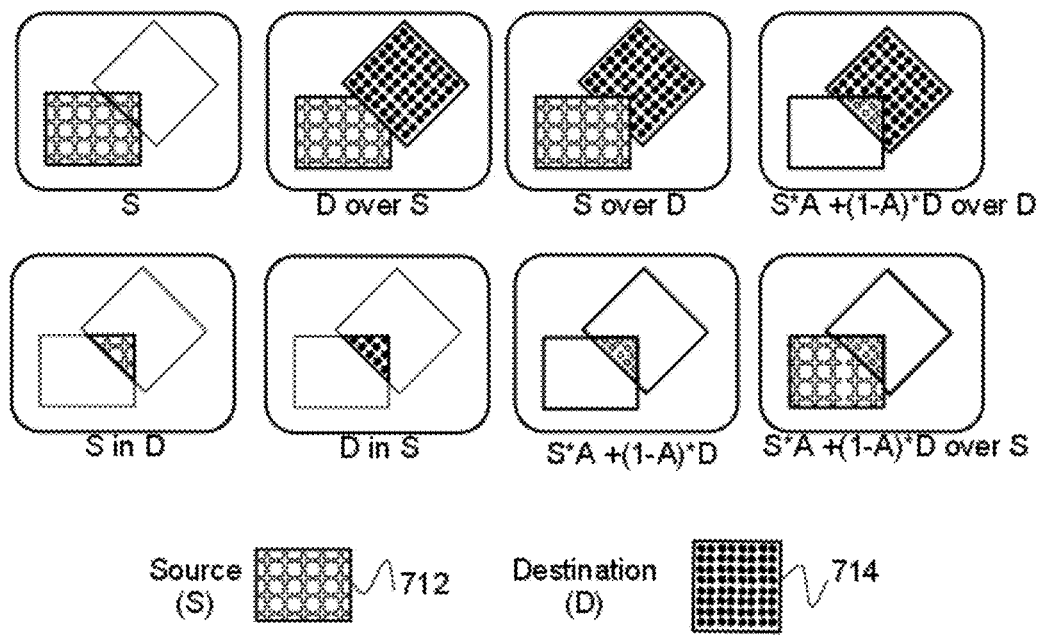
Figure 7: Illustration of basic blending modes

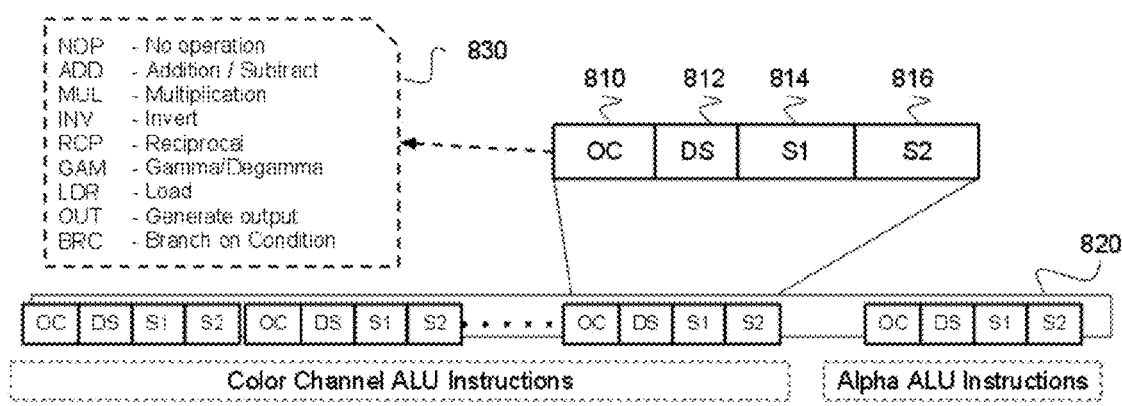
Figure 8: Instruction structure in a possible embodiment of the invention

MULTI-THREADED MULTI-FORMAT BLENDING DEVICE FOR COMPUTER GRAPHICS OPERATIONS

BACKGROUND OF THE INVENTION

The disclosed invention is related to graphics display technology, and more specifically to methods for blending colors in a graphics processing unit. Color blending is a process which combines color channels and alpha channels from sources of image information in order to generate modified image information. One such method has been described by Thomas Porter and Tom Duff in "Compositing Digital Images", *Computer Graphics,* 18(3), July 1984, 253-259.

Blending is required in systems like computer-generated graphics, image fusion for visualisation, graphical user interfaces etc. and is usually part of a Graphics Processing Unit (GPU), i.e. of a device that can render graphic images to be displayed on computer screens.

Image blending was used from the start of motion picture generations (U.S. Pat. No. 1,262,954). Blending was part of computer-based image processing since its origins (U.S. Pat. Nos. 4,384,338, 4,679,040, 4,827,344).

Original blender implementations were based on image multiplexing at the output to a screen via analog circuitry or on software programmes running on standard processors. This method is suitable for applications where high-speed software processing resources are available or where there is no high-speed requirement for the generation of the output images, as is the case with photograph editing.

In order to be able to process blending in real time systems, a hardware blender is required. Methods that implement blending in hardware have been proposed as described in the following paragraphs:

One of the first architectures of a blending apparatus was suggested in U.S. Pat. No. 5,592,196. This apparatus includes instructions for implementing the blending functions. These instructions are included in tables which form a blending mode, making the method fast but not as flexible as a full programmable approach.

A hardware implementation of blending targeted explicitly to 3D graphics has been disclosed in U.S. Pat. No. 5,754,185. This method did not include any programmability mechanism but rather defined blending mode via control signals.

Another hardware implementation is described in U.S. Pat. No. 5,896,136. This description mentions a unit that implements blending equations by using an alpha channel of lower resolution than the RGB channels.

In a structure described in U.S. Pat. No. 7,397,479 a method for providing programmable combination of pixel characteristics is disclosed.

Methods for implementing programmable blending were disclosed with patent application US 2006/192788 and U.S. Pat. No. 7,973,797. In both cases, the instructions for blending are provided by a processing unit loading formula or operation descriptors as a sequence to be executed by the blending hardware.

Blending in the above referenced cases is defined as the process of generating a target pixel fragment value (T) by combining various inputs: a said source pixel fragment (S), a said destination pixel fragment (D) and corresponding alpha values ($A_s$, $A_d$) for the source and destination pixels. Depending on the blending mode a different function (f) is applied in order to calculate the target.

For calculating the target ($T=f(S, A_s, D, A_d)$), an arithmetic and logical unit (ALU) is employed that uses the said inputs and the blending mode in order to produce the target value.

For many blending modes, computing the formula in a single operation requires complex hardware. In order to minimize hardware using simpler operators, the outputs can re-enter the ALU a second time or more until the formula is calculated.

During this iterative process the blender cannot receive new inputs, thus complex blending modes result in lower overall throughput of the GPU. One method to achieve higher throughput is to implement the ALU as a pipeline of at least two threads. If the input pixel fragments can be provided in a continuous flow, the pipeline can produce one output per each clock cycle.

The current state of the art in color blending devices as described above provides fast and programmable functionality. Many different operations—from a predefined set—can be performed on sequences of pixel fragments, where each pixel is represented as a color (c, usually R,G,B) and alpha ($\alpha$) combination.

One shortcoming of current implementations is that they are best fit for systems where the locations of subsequent pixel fragments are more or less continuous. In a modern GPU system like the one shown in FIG. 2, Shader 206 processing and communication to the main memory for reading and writing pixel fragments is a bottleneck. Thus, the system cannot generate a steady flow of continuous pixel fragments.

Another limitation is that most current implementations operate on integer or fixed-point representations. This makes it harder to interface with floating-point pixel sources and frame buffers. Furthermore, this limits the dynamic range of color representation for each pixel fragment.

Another limitation of most current solutions is that the programmability is constrained by a few predefined operators. In one case only (U.S. Pat. No. 7,973,797), the operation is guided by two instructions which can be configured by other entities in the GPU. A more flexible approach is required for full programmability, where any sequence of instructions including flow control can be provided as input in the form of a small program for the blender core.

All existing implementations support the RGBA color scheme that is very common in computer graphics; each pixel fragment is represented by three color channels of Red, Green and Blue (RGB) and an Alpha channel (A). However, if one has to blend non-RGBA pixel fragments (for example pixels in YUVA representation commonly used in video and photography), there needs to be another step of color space conversion, consuming time and bandwidth.

SUMMARY OF THE INVENTION

The disclosed apparatus provides color blending functionality with fully programmable sequences of operations on the source and destination pixel fragments. The architecture of the device is based on the observation that modern graphics systems do not generate steady flow of pixel fragments, leaving the blender with unused processing capability.

The disclosed blender takes advantage of this fact in order to multiplex in time many blending functions on different fragments of pixels. This is achieved by the multithreading capability of the blender core.

The disclosed device is a blender which is build around arithmetic and logic units (ALUs) that implement a plurality of blending functions as defined by a sequence of instructions. The core of the said blender is capable of pipelining the instructions in order to achieve high throughput of results. Furthermore, the said blending core can handle instructions from a plurality of sequences and operate on a plurality of input streams. This feature of the said blending core provides for multithreaded operations, thus minimizing the time a blender has to wait for non-continuous pixel fragments to be fetched from a memory.

The disclosed blending device consists of (a) circuitry that reads, reformats and aligns pixel fragments from two inputs, (b) a blending core that can execute threads of instruction sequences in order to generate a result and (c) an output selection and reformatting circuitry that produces the final output pixel fragments.

In one embodiment, the disclosed apparatus will be able to run the following operations:
- Blending of source & destination pixel fragments according to alpha values and a chosen mode.
- Concurrent multithreaded processing of a plurality of pixel fragments with different blending functions applied to each pixel fragment.
- Implementation of a wide variety of blending modes including the ones defined in the Khronos group standards OpenGL and OpenVG, regardless if the input or output streams are premultiplied or non-premultiplied.
- Conversion from RGB to YUV color space and vice versa.
- Gamma/degamma color correction.

BRIEF DESCRIPTION OF THE DRAWINGS

FIG. 1 shows a typical minimal embedded system-on-chip with a graphics processing unit.

FIG. 2 shows a top level block diagram of a graphical processing unit (GPU) that is implemented using the disclosed blending device.

FIG. 3 shows a possible structure of the disclosed blending device.

FIG. 4 contains a block diagram of a possible embodiment of the core multi-threaded blender.

FIG. 5 shows the internal structure of the ALU blocks of FIG. 4.

FIG. 6 presents the structure of a possible embodiment of an operations pipeline.

FIG. 7 presents some blending mode examples.

FIG. 8 shows a possible structure for the instructions used by the blender.

DETAILED DESCRIPTION OF THE INVENTION

Usage

Graphics Processing Units (GPUs) are increasingly required to perform a plurality of blending functions. When projecting glyphs or user interface items like icons, buttons or window frames over an image, or when combining images from different sources, or when drawing a 3D scene with items on the foreground and items on the background, or when translucent items are displayed, in all those cases a target pixel value on the display is the result of the combination of two input pixel fragments weighted by a value called the alpha of that pixel fragment.

Some examples of blending modes are described in table 1, which are defined in the Qt application framework:

TABLE 1

| Blending mode examples | |
|---|---|
| Name | Description |
| Source Over/ Destination Over | The alpha of the source is used to blend the pixel on top of the destination. Destination Over is the inverse of Source Over. |
| Clear | The pixels in the destination are cleared (set to fully transparent) independent of the source. |
| Source/ Destination | The output is the source/destination pixel. |
| Source In/ Destination In | The output is the source, where the alpha is reduced by that of the destination. Destination In is the inverse of Source In. |
| Source Out/ Destination Out | The output is the source, where alpha is reduced by the inverse of destination. Destination Out is the inverse of Source Out. |
| Source Atop/ Destination Atop | The source pixel is blended on top of the destination, with the alpha of the source pixel reduced by the alpha of the destination pixel. Destination Atop is the inverse of Source Atop. |
| Xor | The source, whose alpha is reduced with the inverse of the destination alpha, is merged with the destination, whose alpha is reduced by the inverse of the source alpha. |
| Plus | Both the alpha and color of the source and destination pixels are added together. |
| Multiply | The output is the source color multiplied by the destination.. |
| Screen | The source and destination colors are inverted and then multiplied. |
| Overlay | Multiplies or screens the colors depending on the destination color. The destination color is mixed with the source color to reflect the lightness or darkness of the destination. |
| Darken | The darker of the source and destination colors is selected. |
| Lighten | The lighter of the source and destination colors is selected. |
| Color Dodge | The destination color is brightened to reflect the source color. A black source color leaves the destination color unchanged. |
| Color Burn | The destination color is darkened to reflect the source color. A white source color leaves the destination color unchanged. |
| Hard Light | Multiplies or screens the colors depending on the source color. A light source color will lighten the destination color, whereas a dark source color will darken the destination color. |

TABLE 1-continued

Blending mode examples

| Name | Description |
|---|---|
| Soft Light | Darkens or lightens the colors depending on the source color. Similar to HardLight. |
| Difference | Subtracts the darker of the colors from the lighter. Painting with white inverts the destination color, whereas painting with black leaves the destination color unchanged. |
| Exclusion | Similar to Difference, but with a lower contrast. Painting with white inverts the destination color, whereas painting with black leaves the destination color unchanged. |
| Source Or/And/ Xor Destination | Does a bitwise OR/AND/XOR operation on the source and destination pixels (src OR dst). |
| Not Source And Not Destination | Does a bitwise NOR operation on the source and destination pixels ((NOT src) AND (NOT dst)). Other similar modes are also defined: ((NOT src) OR (NOT dst)), ((NOT src) XOR dst), (NOT src), ((NOT src) AND dst), (src AND (NOT dst)). |

The example diagram of FIG. 1 shows a typical system that performs graphics processing. The system connects all devices through a Bus Fabric 110 and is controlled by a Central Processing Unit (CPU) 102. Graphics and Imaging functionality is performed in a Graphics Processing Unit (GPU) 200. The program for the CPU and the GPU as well as the images handled by them are stored in a Memory 104. The display of the system is updated through a Display Controller 106.

In one embodiment of the disclosed invention, the GPU and the display controller are connected through a direct link 108 for frame synchronization and bandwidth shaping.

An abstract diagram of the GPU 200 from FIG. 1 is given in FIG. 2. Connections to the CPU 212 and the Memory 214 are shown as direct links for simplicity, although they are typically implemented through a bus fabric. A Primitive Generator 204 block is used to create vectors, polygons, triangles, curves etc. as described in documents like U.S. Pat. No. 5,303,321. The core of the GPU is a processing unit, the Shader 206, which calculates graphics functions in order to determine pixel fragment color and transparency values. One or more of said Shaders can exist in a GPU, each one dealing in parallel to the others with separate primitives or fragments. The output of the said Shader can be processed by units 208 that accelerate the generation of texture elements. Pixel fragments from the Shader are provided as input to a Blender 300, which implements color/alpha blending. The Blender interfaces with the memory 214 for reading background image fragments and in order to store the blended output.

Structure

The disclosed apparatus is hereby described by reference to the block diagram of FIG. 3. This block diagram shows the units that constitute the said blending device (300 in FIG. 2). The block diagram also shows connections between the units.

The disclosed blending device operates on input streams of pixel fragments. One input is the stream of source fragments 302 which is typically provided by a Shader. If the blending mode requires that the output solely depends on the said incoming fragments, then the data simply enters the Source Reformat and clamping circuit 308. If the decision is made 304 that a Destination Fragment is also required, then a request to the memory is issued 318, and the operation waits until the said destination fragment is received 320, and reformatted and clamped 306.

The two input streams come from different sources and need alignment 310 in order to be processed while maintaining spatial coherency. Processing is performed by the core 400 of the said blending device. The output of the core may have to be reformatted 312 if the target frame buffer uses a different pixel format. The same block 312 also performs color dithering in order to enhance the visual experience. When multiple outputs are generated, other circuitry 314 re-orders and aligns the pixel data so that they can be stored in the memory's frame buffer 316.

The core of the disclosed blending device is a Blender Core 400 which is multi-threaded. By allocating processing resources to more than one thread of execution, the blender core can multiplex in time a number of parallel blending operations, hiding the latency of arithmetic units, hiding the latency of reading fragments and sustaining throughput.

FIG. 4 shows a possible embodiment of the said multi-threaded blender core. A brief description of the structure follows. The said blender core reads two aligned and appropriately preformatted pixel fragments, the source 404 and the destination 402, consisting of color and alpha information for each input including possible stencil information in the alpha channel. The two inputs are maintained 406 until a processing slot in the arithmetic logic units becomes available. There are two arithmetic logic units ALUs, one for performing operations with the Alpha channel 430 and one for performing SIMD operations with the color channels 420.

The ALUs perform operations by reading a sequence of instructions from the Instruction Memory Contexts 410. Multiple contexts exist in order to support multithreading. Each instruction sequence forms a small program that is executed by the disclosed blender core utilizing the operators in the said ALUs. The ALUs can also employ temporary data storage and look-up tables 408 to perform certain operations.

The results from the blender core ALUs are selected 412 as defined in the instructions by the output circuitry and appropriately converted 414 to a suitable output pixel format, for example floating point (GL_RGBA32F, GL_RGBA16F), fixed point, RGB888, RGB565 etc.

The output from the said blender core can be stalled based on a signal 108 from the display controller 106, indicating high risk of data starvation which might lead to loss of visible frames.

The internal structure of the ALUs of the disclosed blander core is shown in FIG. 5. As stated, the inputs are pixel fragments formatted for blending. One is the source pixel fragment that consists of source color 502 and source alpha 504.

The second is the destination pixel fragment which consists of destination color 506 and destination alpha 508. The output is a pixel fragment represented by its color channels 516 and its alpha 518.

The color ALU 420 in the diagram contains three parallel operation pipeline blocks 522, 524, 526 so that it can support up to three color channels. Other embodiments with less or more color channels are also possible. The output of each operation pipeline block can be fed back 510 to the ALU for a subsequent processing step or can be forwarded to one of a multitude of intermediate registers 528, 529.

The Alpha ALU 430 contains one operation pipeline block 432 similar to the said operation pipeline blocks of the color ALU. The result is stored in a couple of intermediate registers 538, 539 or fed back 510 to the inputs of the ALUs for the next step in the blending sequence.

The output of the said color ALU is generated by combining or selecting 512 from the said two or more intermediate registers 528, 529 and storing the result in the target pixel color 516. The output of the said alpha ALU is generated by combining or selecting 514 from the said two intermediate registers 538, 539 and storing the result in the target pixel alpha 518.

The detail of each ALU operation pipeline block is shown in a possible embodiment in FIG. 6. The instructions are fetched for multiple threads from the instruction memory contexts 410. A dedicated fetch logic circuitry 418 chooses one instruction from each active thread per clock and feeds them 660 to the internal pipeline stages of the ALU operation. The figure shows an example with four threads A, B, C and D. The first instruction from each thread —instr0— is already in the pipeline, the second instruction from each thread —instr1— is ready to be executed, and the following instructions—inst2, instr3, instr4—wait in the memory contexts.

The first stage is instruction decode 622 which determines the type of instruction and the corresponding operator 632 that must be used. It is possible that the instruction op-code affects directly the next instruction that needs to be fetched, thus executing a non-conditional branch. This branch request 642 is reported to the instruction fetch logic 418.

Data are fetched 624 at the same clock cycle with instruction decode from the input port 610 of the ALU which can be connected to a previous output of the same or another ALU operations pipeline or to a temporary location in memory or to a look-up table. Fetched data are fed to the next pipeline stage via registers 634.

The core operators of each currently processed instruction are in the subsequent pipeline stages 626, 628, 630. Operators include multiplication, addition, subtraction, logical operators, reciprocal and floor/ceiling. The result is stored in pipeline registers 636, 638, 640 and the flags 644 generated by the operation are reported to the instruction fetch logic. The described embodiment uses three pipeline stages for the operators; alternative implementations can include more or less stages to achieve an optimum trade-off between complexity, throughput, latency and number of threads that can be supported.

The output from the last stage of the pipeline 640 is directly placed on the port of the ALU operations pipeline 650. Depending on the op-code, the output can be fed back for a next instruction through the ALU or placed on the output register if processing of the specific data has finished.

A possible embodiment of the disclosed invention will include an instruction code structured as:

[OC: Op-code][DS: Destination][(S1: Source of input A][S2: Source of input B]

and four or more such instructions will constitute a very long instruction word (VLIW) instruction for the entire blending core. This is further illustrated in FIG. 8.

The entire VLIW instruction 820 that goes through the operating units consists of three or more instructions for the color channel pipelines and one instruction for the alpha pipeline. In each VLIW instruction, operations for reading inputs, storing outputs, performing SIMD processing of the RGB channels and branching are combined. Each instruction consists of an op-code 810, a destination descriptor 812 and two source descriptors 814, 816. The op-code 810 can be related to a set of mnemonics 830 for the supported operations.

The disclosed blender device is fully programmable, supporting any possible blending function. Some basic blending operations that are supported are shown in FIG. 7. The source 710 and the destination 720 are two input pixel fragments that can be blended in any of the shown manners.

The disclosed blending device also supports the blending modes defined by OpenVG:

TABLE 2

OpenVG Blending Modes

| Name | color Function |
|---|---|
| Source | $c_{src}$ |
| Source over Destination | $c_{src} + (1 - \alpha_{src})*c_{dst}$ |
| Destination over Source | $c_{src}*(1 - \alpha_{dst}) + c_{dst}$ |
| Source in Destination | $c_{src}*a_{dst}$ |
| Destination in Source | $c_{dst}*a_{src}$ |
| Multiply | $\alpha_{src}*c_{src}*(1 - \alpha_{dst}) + \alpha_{dst}*c_{dst}*(1 - \alpha_{src}) + \alpha_{src}*c_{src}*\alpha_{dst}*c_{dst}$ |
| Screen | $\alpha_{src}*c_{src} + \alpha_{dst}*c_{dst} - \alpha_{src}*c_{src}*\alpha_{dst}*c_{dst}$ |
| Darken | $\min(\alpha_{src}*c_{src} + \alpha_{dst}*c_{dst} *(1 - \alpha_{src}), \alpha_{dst}*c_{dst} + \alpha_{src}*c_{src} *(1 - \alpha_{dst}))$ |
| Lighten | $\max(\alpha_{src}*c_{src} + \alpha_{dst}*c_{dst} *(1 - \alpha_{src}), \alpha_{dst}*c_{dst} + \alpha_{src}*c_{Src} *(1 - \alpha_{dst}))$ |

The disclosed blending device also supports the OpenGL blending modes, where the function is $c=c_{src}*F_{src}+c_{dst}*F_{dst}$:

TABLE 3

Blending modes defined for OpenGL

| Name | $F_{src}, F_{dst}$ |
|---|---|
| Zero | (0, 0) |
| One | (1, 1) |
| Source color | $(C_{src}, \alpha_{src})$ |
| One Minus Source color | $(1 - C_{src}, 1 - \alpha_{src})$ |
| Destination color | $(C_{dst}, \alpha_{dst})$ |
| One Minus Destination color | $(1 - C_{dst}, 1 - \alpha_{dst})$ |
| Source Alpha | $(\alpha_{src}, \alpha_{src})$ |
| One Minus Source Alpha | $(1 - \alpha_{src}, 1 - \alpha_{src})$ |
| Destination Alpha | $(\alpha_{dst}, \alpha_{dst})$ |
| One Minus Destination Alpha | $(1 - \alpha_{dst}, 1 - \alpha_{dst})$ |
| Source Alpha Saturate | $\min(\alpha_{src}, 1 - \alpha_{dst})$ |

To illustrate the functionality of the said blending device, an example of a specific operation is presented. The example shows the instruction sequence for implementing a "Source Over" blending operation with non-premultiplied inputs, as defined by the formula:

$$\frac{c_{src} * \alpha_{src} + (1 - \alpha_{src}) * c_{dst} * \alpha_{dst}}{\alpha_{src} + (1 - \alpha_{src}) * \alpha_{dst}}$$

The corresponding VLIW instructions are shown in the following listing.

| 1: MUL P0, Cs, As | NOP | LDR Pa, As | MUL Pb, Ad, (1 – As) |
|---|---|---|---|
| 2: MUL P1, Cd, (1 – As) | ADD Pc, Pa, Pb | NOP | NOP |
| 3: MUL P2, P1, Ad | ADD P3, P0, P2 | NOP | RCP Pd, Pc |
| 4: MUL P1, P3, Pd | NOP | OUT P1, Pa | NOP |

The first VLIW instruction multiplies source color with source alpha $c_{src}*\alpha_{src}$ storing the result in an intermediate register P0, multiplies destination alpha with the inverse of source alpha $(1-\alpha_{src})*\alpha_{dst}$ and prepares the denominator $\alpha_{src}+(1-\alpha_{src})*\alpha_{dst}$ in a register Pc. The second instruction finds the reciprocal of Pc into a register Pd, and multiplies destination color $c_{dst}$ with $(1-\alpha_{src})$ storing this in register P1. The third instruction multiplies P1 with the destination alpha and adds P0 and P2, the two parts of the nominator. The fourth VLIW line finalizes calculation by multiplying the nominator P3 with the reciprocal of the denominator Pd. It also sends a command to the output selection blocks 512, 514 to provide the results (P1 and Pa) to the output of the blender on the following clock cycle.

*Work that led to the development of this invention, was co-financed by Hellenic Funds and by the European Regional Development Fund (ERDF) under the Hellenic National Strategic Reference Framework (NSRF) 2007-2013, according to Contract no. MICRO2-035 of the Project "TSi-ThinkVG" within the Programme "Hellenic Technology Clusters in Microelectronics—Phase-2 Aid Measure".

What is claimed is:

1. A device for parallel multithreaded blending in graphics systems comprising:
    means to receive a plurality of color components and alpha information from multiple source and multiple destination image fragment streams;
    a blender processing unit capable of combing in parallel the color and alpha channels from a plurality of pixels in the source and destination images in order to produce a plurality of fragment pixels of a target image;
    the blender processing unit capable of executing at least two parallel threads of operation, wherein said blender processing unit multiplexes in time a plurality of blending functions and memory operations on different fragments;
    the blender processing unit supporting concurrent multithreaded processing of the plurality of fragments with different blending functions applied to each fragment;
    the blender processing unit processes each of the multiple concurrent threads in round robin fashion;
    the blender processing unit comprising multiple register files, multiple execution units, and multiple instruction pointers wherein each parallel thread is associated with a specific and predetermined instruction memory and instruction pointer; and
    the blender processing unit comprising multiple instruction memories, wherein each instruction memory is associated with one thread and each instruction memory contains instruction code formatted as a very long instruction word and includes multiple op-codes, multiple destination descriptors, and multiple source descriptors.

2. The device of claim 1, where color and alpha information is processed in floating point format.

3. The device of claim 1, where color and alpha information is processed in logarithmic number format.

4. The device of claim 1, where color and alpha information is processed in fixed point format.

5. The device of claim 1, where color and alpha information can be processed in a chosen format at run time, where the choice is between at least two of fixed point, floating point, integer and logarithmic.

6. The device of claim 1, where the color channel is represented in red, green and blue (RGB) colors, or in Luminance and Chrominance (YUV) components, the device capable of converting color channels from the RGB representation to YUV representation and from YUV representation to RGB representation.

7. The device of claim 1, further comprising an instruction code, wherein the instruction code is formatted as a very long instruction word and includes one or more op-codes, one or more destination descriptors, and a plurality of source descriptors.

8. The device of claim 1, wherein the blending device comprises a plurality of parallel arithmetic and logical units, having associated intermediate registers, which output to one or more selection/combination logic units.

9. The device of claim 8, wherein each arithmetic and logical unit includes one or more input registers, a plurality of pipeline stages and a plurality of pipeline registers and shared instruction fetch logic.

10. A GPU unit equipped with a blending device, the said GPU interfacing to a display controller through a signal which notifies the said GPU for bandwidth availability, so that the said GPU can adapt its throughput, wherein the blending device is adapted to combine in parallel color and alpha channels from a plurality pixels in multiple source and multiple destination images in order to produce multiple fragments of a target image, the blending device also adapted to execute at least two parallel threads of operation, wherein the blending device multiplexes in time a plurality of blending functions and memory operations on different fragments, the blending device supporting concurrent multithreaded processing of the plurality of fragments with different blending functions applied to each fragment;
    the blending device processing each of the multiple concurrent threads in round robin fashion;
    the blending device comprising multiple register files, multiple execution units, and multiple instruction pointers wherein each parallel thread is associated with a specific and predetermined instruction memory and instruction pointer; and
    the blending device comprising multiple instruction memories, wherein each instruction memory is associated with one thread and each instruction memory contains instruction code formatted as a very long instruction word and includes multiple op-codes, multiple destination descriptors, and multiple source descriptors.

11. A method for parallel multithreaded blending in graphics systems comprising:
    receiving a plurality of color components and alpha information from multiple source and multiple destination image fragment streams;
    combing, in parallel, the color and alpha channels from a plurality of pixels in the source and destination images in order to produce multiple fragments of a target image by executing at least two parallel threads of operation, wherein a blender processing unit multiplexes in time a plurality of blending functions and memory operations on different fragments, the blender processing unit supporting concurrent multithreaded processing of the plurality of fragments with different blending functions applied to each fragment;

the blender processing unit processing each of the multiple concurrent threads in round robin fashion;

the blender processing unit comprising multiple register files, multiple execution units, and multiple instruction pointers wherein each parallel thread is associated with a specific and predetermined instruction memory and instruction pointer; and the blender processing unit comprising multiple instruction memories, wherein each instruction memory is associated with one thread and each instruction memory contains instruction code formatted as a very long instruction word and includes multiple op-codes, multiple destination descriptors, and multiple source descriptors.

12. The method of claim 11, where color and alpha information is processed in floating point format.

13. The method of claim 11, where color and alpha information is processed in logarithmic number format.

14. The method of claim 11, where color and alpha information is processed in fixed point format.

15. The method of claim 11, where color and alpha information can be processed in a chosen format at run time, where the choice is between at least two of fixed point, floating point, integer and logarithmic.

16. The method of claim 11, where the color channel is represented in red, green and blue (RGB) colors, or in Luminance and Chrominance (YUV) components, the device capable of converting color channels from the RGB representation to YUV representation and from YUV representation to RGB representation.

17. The method of claim 11, further comprising instruction code, wherein the instruction code is formatted as a very long instruction word and includes an op-code, a destination descriptor, and a plurality of source descriptors.

18. The method of claim 11, wherein the blender processing unit comprises a plurality of parallel arithmetic and logical units, having associated intermediate registers, which output to one or more selection/combination logic units.

19. The method of claim 18, wherein each arithmetic and logical unit includes one or more input registers, a plurality of pipeline stages, a plurality of pipeline registers and shared instruction fetch logic.

20. A device for blending in graphics systems comprising:

source and destination image fragment streams that supply a plurality of color components and alpha information;

a blender processing unit adapted to combine in parallel the color and alpha channels from fragments in multiple source and multiple destination images in order to produce a fragment pixel of a target image;

the blender processing unit further adapted to execute in parallel multiple color and alpha data belonging to same or to different target pixels;

the blender processing unit including pipelined arithmetic units;

the blender processing unit adapted to execute at least two parallel threads of operation, with a threading operation in color and alpha data belonging to the same or to different pixels;

the blender unit containing multiple register files to support multithreading;

the blender unit including a plurality of pipelined arithmetic units;

the blender processing unit processing each of the multiple concurrent threads in round robin fashion;

the blender processing unit comprising multiple register files, multiple execution units, and multiple instruction pointers wherein each parallel thread is associated with a specific and predetermined instruction memory and instruction pointer; and the blender processing unit comprising multiple instruction memories, wherein each instruction memory is associated with one thread and each instruction memory contains instruction code formatted as a very long instruction word and includes multiple op-codes multiple destination descriptors, and multiple source descriptors; and a storage device adapted to hold a sequence of operations for the blender processing unit, the storage device storing information about how the multiple color and alpha data belonging to the same or to different target pixels can be processed in parallel, wherein the storage device is divided in multiple contexts in order to support multithreading.

* * * * *